United States Patent [19]

Dimon

[11] Patent Number: 4,850,185
[45] Date of Patent: Jul. 25, 1989

[54] SELF-CLEANING RAKE

[76] Inventor: James A. Dimon, 403 Ridge Rd., San Carlos, Calif. 94070

[21] Appl. No.: 162,202

[22] Filed: Feb. 29, 1988

[51] Int. Cl.⁴ .............................................. A01D 7/10
[52] U.S. Cl. .................................. 56/400.1; 56/400.17
[58] Field of Search ........... 56/400.08, 400.09, 400.10, 56/400.12, 400.16, 400.17, 400.18

[56] References Cited

U.S. PATENT DOCUMENTS

| | | | |
|---|---|---|---|
| 1,065,997 | 7/1913 | Bentlax | 56/400.08 |
| 1,149,098 | 8/1915 | Tanaka | 56/400.18 |
| 1,981,488 | 11/1934 | Wilkander et al. | 56/400.1 |
| 2,049,595 | 8/1936 | Swanson | 56/400.1 |
| 2,179,946 | 11/1939 | Miller | 56/400.1 |
| 3,130,533 | 4/1964 | Huegel et al. | 56/400.17 |
| 3,258,903 | 7/1966 | Rienacker et al. | 56/400.18 |
| 3,654,734 | 4/1972 | Scoggin, Jr. et al. | 56/400.17 |
| 3,750,379 | 8/1973 | Huspen | 56/400.18 |
| 3,804,451 | 4/1974 | Burke | 56/400.18 |
| 4,059,945 | 11/1977 | Martinez | 56/400.1 |

FOREIGN PATENT DOCUMENTS 113906  9/1941  Australia .......................... 56/400.18

Primary Examiner—Paul J. Hirsch
Attorney, Agent, or Firm—Douglas E. White

[57] ABSTRACT

A hand held garden implement, namely a rake, contains means for cleaning its own tines of collected leaves, vegetable matter or other adhering material. The head of the rake, containing a plurality of tines, moves as a unit. This movement draws the end prongs or teeth of the tines into tubes extending throughout the length of a cleaning shield. The shield is rigidly affixed to the rake handle. The head and tines are moved longitudinally upwardly and downwardly along the rake handle by means of a hand grip conveniently located near the top of the rake handle so that an operator does not have to stoop and reach down or reverse the orientation of the rake to clean it.

4 Claims, 2 Drawing Sheets

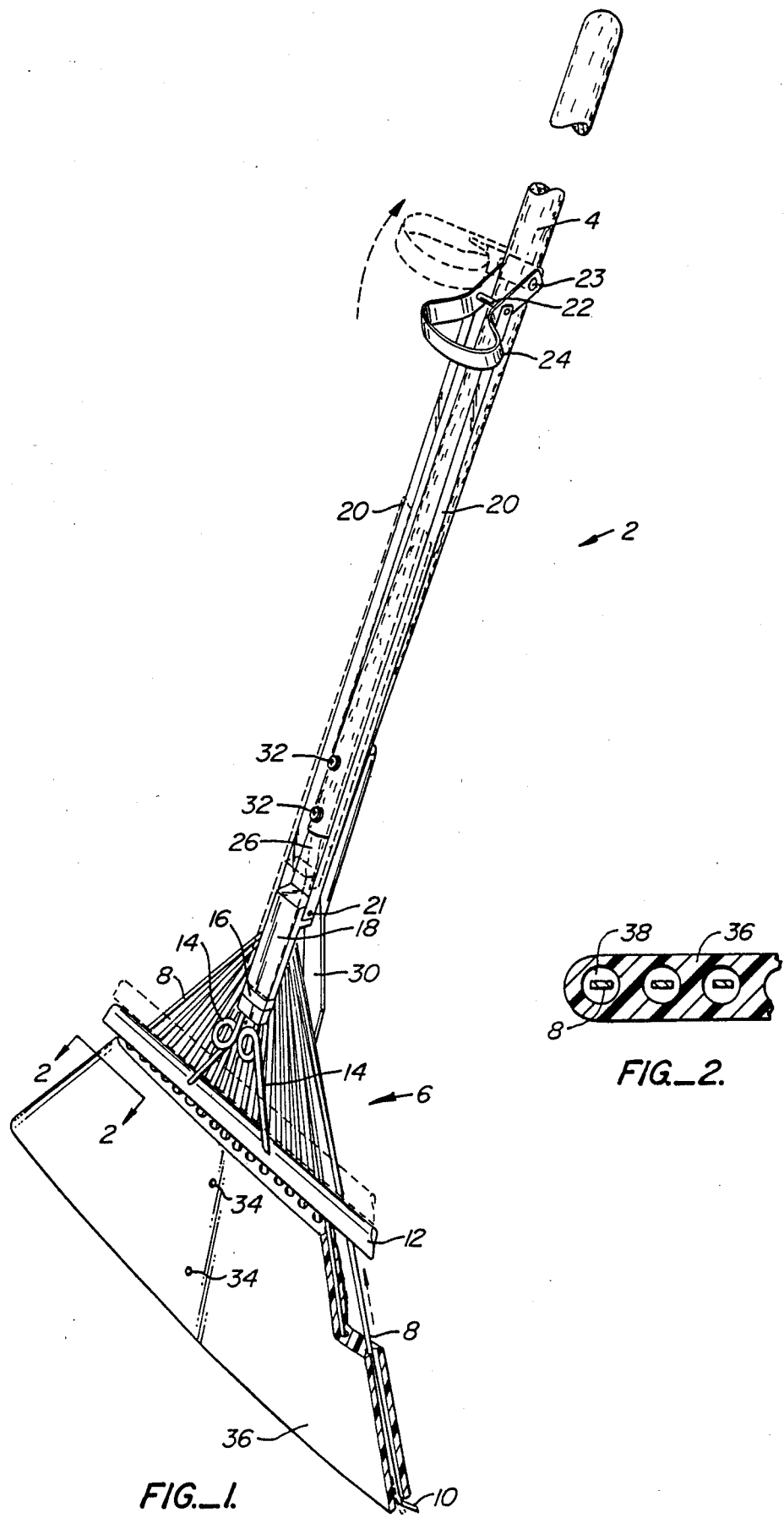

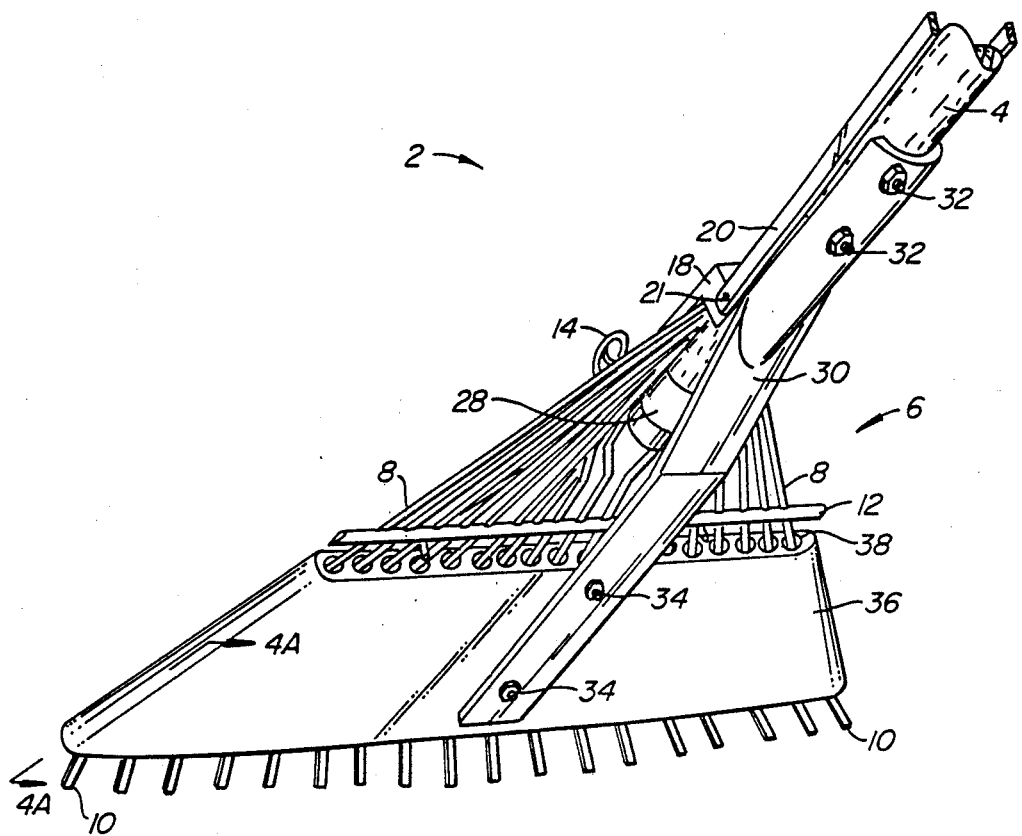
FIG._3.
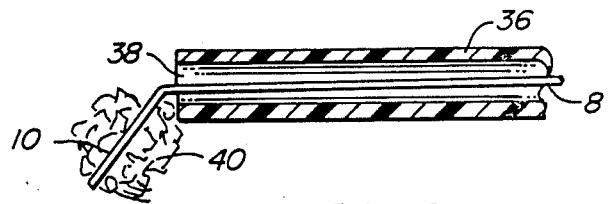
FIG._4A.
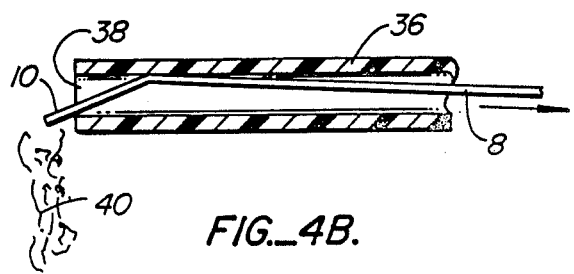
FIG._4B.

SELF-CLEANING RAKE

FIELD OF THE INVENTION

This invention relates to lawn and garden rakes, more particularly to a rake that cleans itself of leaves, grass and other vegetable matter.

BACKGROUND OF THE INVENTION

One of the more frustrating jobs associated with leaf or grass raking is the need to periodically bend down (or to reverse the orientation of the rake and bring up its head) and reach for the rake head in order to manually clean away material which adheres to the rake tines in the areas between the prongs. This has to be done very often - perhaps after only one or two strokes in the case of certain types of leaves or vegetable garden matter, or when the matter is wet. Repeated stooping is fatiguing and may even be harmful to the back, particularly in the case of elderly gardeners. Bringing the rake head up is also unsatisfactory as it disrupts the normal flow and repetition of the rake strokes.

Much effort, apparently unsuccessful as measured by the lack of known commercialization, has therefore been directed toward developing a rake which is "self-cleaning;" which is to say, one which may be cleaned without the operator either having to stoop down or having to bring the rake head up.

Prior developments in this field will be generally illustrated by reference to the following U.S. Pat. Nos.:

| Patent No. | Patentee | Issue Date |
| --- | --- | --- |
| 1,338,459 | Moore | 04/27/20 |
| 1,450,877 | Wahlen | 04/03/23 |
| 1,768,101 | Bell | 06/24/30 |
| 1,780,688 | Steinmetz et al. | 11/04/30 |
| 2,731,784 | Noll | 01/24/56 |

The above patents teach self-cleaning rakes that have racks and similar attachments that move across the prongs of stationary rake tines to clean them. None show means for moving the tines themselves across stationary cleaning means.

SUMMARY OF THE INVENTION

The present invention is a hand held garden implement, namely a rake, which contains means for cleaning its own tines of collected leaves, grass, vegetable matter or other adhering material. Unlike the prior art, the head of the rake, containing a plurality of tines, moves as a unit with respect to the handle. This movement draws the end prongs or teeth of the tines into tubular apertures extending throughout the length of a cleaning shield. In an alternate embodiment the shield comprises a plurality of individual tubes of unitary structure, each tube containing one tine. While the term "tube" may be used hereinbelow to refer to either a structure containing a passage or to the interior passage itself, the term "tubular aperture" will be used only to connote the passage. The shield is rigidly affixed to the rake handle. The head and tines are moved longitudinally upwardly and downwardly with respect to the rake handle by means of a hand grip conveniently located near the top of the rake handle so that an operator does not have to stoop or reach down to clean the rake.

FEATURES AND ADVANTAGES

An object of this invention is to provide improved means for cleaning garden rakes. Accordingly, a moveable rake head is disclosed.

Another object is to provide a means for moving the rake head that does not require the operator either to stoop forward or to bring the rake head up within reach. A grip located on the upper end portion of the rake handle connects with the moveable head.

Yet another object is to disclose means for cleaning the moveable head. A unique cleaning shield is fixed in place to the bottom of the rake handle in my invention.

Yet another object is to provide cleaning means integral to the shield. Tubular apertures extend throughout the length of the shield. The rake tines may move freely within them.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, the words "upwardly," "downwardly," "leftwardly", and "rightwardly" will refer to directions in the drawings to which reference is made. The words "inwardly" and "outwardly" will refer to directions toward and away from, respectively, the geometric center of a device and designated parts thereof.

BRIEF DESCRIPTION OF THE DRAWING

FIG. 1 is a fragmentary sectional perspective view of a preferred embodiment of the rake of my invention in one position and shows the rake in a second position in phantom;

FIG. 2 is a fragmentary sectional view of the tines and shield of the rake taken along line 2—2 of FIG. 1;

FIG. 3 is a fragmentary perspective view from the bottom of the head of the rake of FIG. 1;

FIG. 4A is a fragmentary sectional view of the shield taken along line 4A—4A of FIG. 3 showing a tine in a first position; and FIG. 4B shows the tine of FIG. 4A in a second position.

DESCRIPTION OF A PREFERRED EMBODIMENT

Referring to FIG. 1, there is illustrated therein a self-cleaning rake of my invention, generally designated 2. Rake 2 comprises elongated cylindrical handle 4 terminating in a head 6. Head 6 comprises a large plurality of elongated, preferably flat, tines 8 held together in spaced relation by a cross-bar 12. Tines 8 terminate in leaf grasping prongs or teeth 10 and are preferably made of flexible spring steel, but may be molded plastic. Springs 14 act as shock absorbers when the tines flex from being struck against the ground. A collar 16 or other suitable means connects the tines 8 to a moveable traveler 18.

Traveler 18 moves longitudinally upwardly and downwardly along handle 4 within groove 26 in the lower end of the handle. Traveler 18 may be held in place by a ring 28 within which the lower end of the handle is moveably journaled.

At least one connecting rod 20 is attached by a pin 21 to the traveler and provides the traveler with communication with moveable operating grip 24, the latter of which is located within the upper end portion of handle 4, within easy reach of the hands of the operator. Rod or rods 20 rotate about the axis of pin 22 of grip 24. Grip 24, in turn, rotates about the axis of pin 23 which traverses the interior of handle 4. By moving the grip 24 from one position to another in the manner illustrated in FIG. 1, the operator can cause the tines to move upward and downward along the longitudinal axis of the handle.

Referring to FIGS. 1 and 2, brace or bracket 30 is affixed to the lower end of the handle by bolts or rivets 32. The unique fixed cleaning shield 36 of my invention is attached to brace 30 by bolts or rivets 34. Shield 36 may be molded in two parts and then glued, bolted or riveted together. In an alternate embodiment shield 36 comprises a plurality of individual tubes (not illustrated), each tube containing one tine 8. In any event, shield 30 does not have to extend in length up as far as cross-bar 12 as shown in FIG. 1. It could be made much shorter or in a different shape, to save material and weight, and still perform its intended function.

Longitudinal tubular apertures 38 extend the length of shield 36 so that tines 8, journaled one to a tubes 38, are freely slideable within them. Although tube 38 are preferably of circular cross-section as shown in FIG. 2, they may alternately be rectangular channels, or of other configuration, as long as they are only slightly wider than the width of tines 8. In other words, they are only as wide as is necessary to allow the tines to move freely while preventing matter from entering in between the inner walls of the tubes and the sides of the tines. In an embodiment designed for maximum cleaning efficiency, the shape of the tubes 38 will conform to that of the tines 8, yet be slightly larger to allow free tine movement and to allow the bent prongs 10 to enter the tube ends after flexing.

The rake 2 is operated in the following manner. In a first position, drawn in solid in FIG. 1, the moveable head 6 is extended downwardly with respect to the fixed shield 36 and handle 4. In that position, prongs 10 are fully extended and the rake 2 may be stroked along the ground in the usual manner. When the spaces between the prongs 10 become clogged with leaves, grass, vegetable matter or other material, the head 6 may be retracted up the handle 4 within shield 36 by rotating the grip 24, as shown in phantom in a second position in FIG. 1.

FIGS. 4A and 4B show the cleaning action on the prongs 10 in the first and second positions of FIG. 1, respectively. In FIG. 4A the prongs 10 are extended and bent downwardly for normal raking and have collected vegetable matter 40 between them. In FIG. 4B, pulling on grip 24 upwardly (longitudinally toward the top of handle 4) retracts the tines 8 into tubes 38. Prongs 10 are also partially or fully retracted into the tubes, temporarily bending or flexing them slightly in the process.

Since prongs 10 are made of spring steel, plastic or similar resilient material, they press with considerable force on the undersides of tube 38. This provides a strong positive scraping action that removes adhering vegetable matter 40, which then drops away. Pushing grip 24 downwardly restores the prongs to their original extended position and shape for further raking after this cleaning.

While the above provides a full and complete disclosure of the preferred embodiments of this invention, various modifications, alternate constructions, and equivalents may be employed without departing from the true spirit and scope of the invention. Therefore, the above description and illustrations should not be construed as limiting the scope of the invention which is defined by the appended claims.

I claim:

1. A rake including:

an elongated handle having an upper and a lower end;

a head having a plurality of flexible tines having downwardly angled prongs, the head moveable attached to the lower end of the handle;

means for moving the head and tines alternately toward the upper end of the handle to a first position and away from the upper end of the handle to a second position, the moving means including a grip rotatable through an angle of greater than 90 degrees at the upper end of the handle, a traveler moveably engaged with the lower end of the handle in a groove terminating in a stop, the groove defined in the lower end of the handle, the traveler affixed to the head, and a pair of connecting rods for operably connecting the grip and the traveler;

a cleaning shield rigidly affixed to the lower end of the handle; and longitudinal tubes defined in the shield extending upwardly throughout the full length of the shield in the general direction of the upper end of the handle, the tubes moveably containing the tines with at least one tine to a tube, the prongs lying outside of the tubes unflexed in the second position and lying inside the tubes temporarily flexed upwardly in the first position, and the tubes being slightly wider at their widest point than the width of the tines.

2. The apparatus of claim 1 wherein the tines are made of spring steel.

3. The apparatus of claim 1 wherein the tines are made of plastic.

4. The apparatus of claim 2 wherein the tubes have circular cross-sections.

* * * * *